United States Patent [19]

Brauer et al.

[11] Patent Number: 5,567,791
[45] Date of Patent: Oct. 22, 1996

[54] PROCESS FOR THE CONTINUOUS PRODUCTION OF THERMOPLASTIC POLYURETHANE ELASTOMERS

[75] Inventors: Wolfgang Brauer, Leverkusen; Friedemann Muller, Neuss; Herbert Heidingsfeld, Frechen; Bernhard Schulte, Krefeld; Jurgen Winkler, Langenfeld, all of Germany

[73] Assignee: Bayer Aktiengesellschaft, Leverkusen, Germany

[21] Appl. No.: 391,507

[22] Filed: Feb. 21, 1995

[30] Foreign Application Priority Data

Mar. 3, 1994 [DE] Germany .................. 44 06 948.0

[51] Int. Cl.$^6$ .................. C08G 18/16; C08G 18/18; C08G 18/22; C08G 18/24
[52] U.S. Cl. .................. 528/52; 264/176.1; 528/44; 528/53; 528/54; 528/55; 528/56; 528/58; 528/76; 528/80; 528/83; 528/85
[58] Field of Search .................. 528/56, 58, 76, 528/80, 83, 85, 44, 52, 53, 55, 54; 264/176.1

[56] References Cited

U.S. PATENT DOCUMENTS

| | | | |
|---|---|---|---|
| 3,642,964 | 2/1972 | Rausch, Jr. et al. | 528/83 |
| 4,169,196 | 9/1979 | Ehrlich et al. | 528/58 |
| 4,245,081 | 1/1981 | Quiring et al. | 528/65 |

FOREIGN PATENT DOCUMENTS 571831  12/1993  European Pat. Off. .

OTHER PUBLICATIONS

Smith et al.; *Principles and Practice of Automatic Process Control*; John Wiley and Sons; New York; 1985, pp. 1–9.
*Encyclopedia of Polymer Science and Engineering; Supplement Volume*; John Wiley and Sons; New York; 1989; pp. 231–241.

Mark et al.; *Physical Properties of Polymers*, Second Edition; American Chemical Society; Washington, D.C.; 1993; pp. 168–169.

Schollenberger et al., "Thermoplastic Polyurethane Elastomer Molecular Weight–Property Relations, Further Studies"; *Advances in Urethane Science and Technology*; vol. 7; Technomic Publishing Co.; Westport, CT, (date unknown).

*Primary Examiner*—James J. Seidleck
*Assistant Examiner*—Rabon Sergent
*Attorney, Agent, or Firm*—Connolly & Hutz

[57] ABSTRACT

A method whereby the properties, particularly the recrystallisation temperature, of thermoplastic polyurethane elastomers, particularly those suitable for processing by extrusion, are kept constant during continuous manufacture in screw-type extruding machines by continuously adding substantially straight-chain hydroxyl-terminated polyols having a molecular weight of 500 to 5000, organic diisocyanates and diol and optionally triol chain-lengthening agents having a molecular weight of 62 to 500, the molar ratio of polyols to chain-lengthening agents being 1:1 to 1:5, and by continuous addition of a catalyst, wherein the recrystallisation temperature is set at a value at least 2° C. below the value for the corresponding TPU manufactured without a catalyst, and when the set recrystallisation temperature is exceeded, the amount of continuously supplied catalyst is increased, whereas when the value falls below, the amount is decreased so as to maintain the set value, the resulting elastomers and use thereof for extrusion.

12 Claims, No Drawings

PROCESS FOR THE CONTINUOUS PRODUCTION OF THERMOPLASTIC POLYURETHANE ELASTOMERS

Thermoplastic polyurethane elastomers (TPUs) and manufacture thereof are known. The properties of TPUs, by a suitable choice of starting materials and reaction conditions, can be varied within wide limits and thus adapted to a wide range of applications (compare Kunststoffe 68 (1978) pages 819 to 825 and Kautschuk, Gummi, Kunststoffe 35 (1982) pages 568 to 584).

Thermoplastic polyurethane elastomers are manufactured from straight-chain polyols, usually polyesters or polyethers, organic isocyanates and short-chain diols (chain-lengthening agents). Catalysts can be added to accelerate the reaction. The proportion of catalyst, depending on the reactivity of the starting substances and the choice of the reaction conditions, can be 5 to 1000 ppm relative to the polyols (DE-A 3 224 324; U.S. Pat. Nos. 5 200 491).

Thermoplastic polyurethane elastomers can be manufactured either in steps (prepolymer method) or in one step by simultaneously reacting all the starting substances (one-shot method). In the prepolymer method, a prepolymer containing isocyanate groups is first formed from the polyol and the diisocyanate and then reacted with the chain-lengthening agent in a second step.

In industry, continuous processes are preferred. The most well-known are the "belt" process and the extruder process. Thermoplastic polyurethane elastomers are divided into two main groups, depending on whether they are suitable for processing by injection-moulding or processing by extrusion.

TPU types suitable for injection moulding are subjected during processing to strong shearing forces, which increase the temperature and also melt the substances before processing. These TPUs must of course withstand the stresses during processing without adverse effect on their properties. They must also solidify very quickly after moulding, to obtain short cycle times for injection moulding.

TPUs suitable for processing by extrusion have a completely different range of properties. They need to form completely homogeneous melts when subjected to much smaller shearing forces. This is the only way of obtaining moulded members with a faultless homogeneous surface. This is critical, particularly in the manufacture of films by blowing an extruded flexible tube. Since thermoplastic polyurethane elastomers have wide melting ranges and the melt has high viscosity and limited capacity to flow, the viscosity and morphology of the melt need to be completely constant, particularly in the case of TPUs for processing by extrusion.

Hitherto there has been no method of controlling the continuous manufacture of thermoplastic polyurethane melts in screw-type extrusion machines with sufficient accuracy to obtain products of suitable quality for extrusion, in a uniform and reproducible manner.

The invention is based on the discovery that the catalysts used in the manufacture of TPUs, besides accelerating the reaction, also influence the morphological qualities such as the crystallinity of the TPUs. If the conditions and starting substances are the same in other respects, the crystallinity decreases when the amount of catalyst increases. The crystallisation properties can be described via the recrystallisation temperature of thermoplastically processable polyurethane elastomers, measured in ° C., when the melt is cooled at 40° C. per minute in a differential scanning calorimeter (DSC). The knowledge that the recrystallisation temperature depends on the proportion of catalyst can be used to control the continuous manufacturing process.

Accordingly the invention relates to a method whereby the properties, particularly the recrystallisation temperature, of thermoplastic polyurethane elastomers, particularly those suitable for processing by extrusion, are kept constant during continuous manufacture in screw-type extruding machines by continuously adding substantially straight-chain hydroxyl-terminated polyols having a molecular weight of 500 to 5000, organic diisocyanates and diol and optionally triol chain-lengthening agents having a molecular weight of 62 to 500, the molar ratio of polyols to chain lengthening agents being 1:1 to 1:5, and by continuous addition of a catalyst, characterised in that the recrystallisation temperature is set at a value at least 2° C. below the value for the corresponding TPU manufactured without a catalyst, and when the set recrystallisation temperature is exceeded, the amount of continuously supplied catalyst is increased, whereas when the value falls below, the amount is decreased so as to maintain the set value.

In order to apply this method of control, therefore, a thermoplastic polyurethane elastomer must be prepared and its recrystallisation temperature determined, using the available starting products and the set reaction conditions without a catalyst. The recrystallisation temperature is the maximum possible under the set conditions. Next, depending on the intended application, a set value is chosen for the recrystallisation temperature, not more than 40° C. below and at least 2° C. below the maximum value. If a TPU is then manufactured under the same conditions but using a catalyst, the resulting material has a recrystallisation temperature below the maximum value, and adjustable to the set value by increasing or reducing the amount of continuously-added catalyst. When the set value is reached, it can be maintained by very slightly increasing or reducing the amount of catalyst.

The preferred polyols for manufacturing thermoplastic polyurethane elastomers are polyesters, polyethers, polycarbonates or a mixture thereof.

Suitable polyetherols can be prepared by reacting one or more alkylene oxides containing 2 to 4 carbon atoms in the alkylene radical with a starter molecule containing two active hydrogen atoms in combination. The following are examples of alkylene oxides: ethylene oxide, 1,2-propylene oxide, epichlorohydrin and 1,2- and 2,3-butylene oxide. It is preferable to use ethylene oxide, propylene oxide or mixtures of 1,2-propylene oxide and ethylene oxide. The alkylene oxides can be used singly, alternately or in mixtures. The following are examples of possible starter molecules: water, amino alcohols such as N-alkyl diethanolamines, e.g. N-methyl diethanolamine or diols such as ethylene glycol, 1,3-propylene glycol, butanediol-1,4 or hexanediol-1,6. Optionally also, mixtures of starter molecules can be used. The polyetherols can also be polymerisation products of tetrahydrofuran containing hydroxyl groups.

Use can also be made of trifunctional polyethers in proportions of 0 to 30 wt.% relative to the bifunctional polyethers.

The polyetherols, which are mainly straight-chain, preferably have molecular weights from 500 to 5000. They can be used individually or in mixtures.

Suitable polyesterols can be prepared e.g. from dicarboxylic acids containing 2 to 12 carbon atoms, preferably 4 to 6 carbon atoms, and polyhydric alcohols. The following are examples of suitable dicarboxylic acids: aliphatic dicarboxylic acids such as succinic acid, glutaric acid, adipic acid, suberic acid, azelaic acid or sebacic acid and aromatic dicarboxylic acids such as phthalic acid, isophthalic acid or terephthalic acid. The dicarboxylic acids can be used individually or in mixtures, e.g. in the form of a mixture of succinic, glutaric and adipic acid. In the manufacture of polyesterols it may be advantageous to replace dicarboxylic acids by the corresponding dicarboxylic acid derivatives such as carboxylic acid diesters containing 1 to 4 carbon atoms in the alcohol radical, or carboxylic acid anhydrides or carboxylic acid chlorides. The following are examples of polyhydric alcohols: glycols with 2 to 10, preferably 2 to 6 carbon atoms such as ethylene glycol, diethylene glycol, butanediol-1,4, pentanediol-1,5, hexanediol-1,6, decanediol-1,10, 2,2-dimethylpropanediol-1,3, propanediol-1,3 or dipropylene glycol. Depending on the desired properties, polyhydric alcohols can be used alone or optionally mixed with one another.

Use can also be made of carbonic acid esters with the aforementioned diols, more particularly esters with 4 to 6 carbon atoms such as butanediol-1,4 and/or hexanediol-1,6, condensation products of ω-hydroxycarboxylic acids, e.g. ω-hydroxycaproic acid or preferably polymerisation products of lactones, e.g. substituted ω-caprolactones.

The following polyesterols are preferred: ethanediol polyadipates, 1,4-butanediol-polyadipates, ethanediol-butanediol-1,4-polyadipates, 1,6-hexanediol neopentyl glycol polyadipates, 1,6-hexanediol-1,4-butanediol polyadipates and polycaprolactones.

The polyesterols have molecular weights from 500 to 5000.

The organic diisocyanates can e.g. be aliphatic, cycloaliphatic, araliphatic, heterocyclic or aromatic diisocyanates, as described e.g. in Justus Liebigs Annalen der Chemie, 562, pages 75 to 136.

The following are individual examples: aliphatic diisocyanates suchas hexamethylene diisocyanate, cycloaliphatic diisocyanates such as isophorone diisocyanate, 1,4-cyclohexane diisocyanate, 1-methyl-2,4-and -2,6-cyclohexane diisocyanate or the corresponding isomer mixtures, 4,4'-, 2,4'- and 2,2'-dicyclohexylmethane diisocyanate or the corresponding isomer mixtures and aromatic diisocyanates such as 2,4-toluylene diisocyanate, mixtures of 2 4- and 2 6-toluylene diisocyanate, 4,4'-, 2,4'- and 2,2'-diphenyl methane diisocyanate, mixtures of 2,4'- and 4,4'-diphenyl methane diisocyanate, urethane-modified liquid 4,4'- and/or 2,4'-diphenyl methane diisocyanates, 4,4'-diisocyanatodiphenylethane-(1,2) and 1,5-naphthylene diisocyanate. Preferably use is made of 1,6-hexamethylene diisocyanate, isophorone diisocyanate, dicyclohexyl methane diisocyanate or diphenyl ethane diisocyanate isomer mixtures with a 4,4'-diphenyl methane diisocyanate content above 96 wt.%, particularly 4,4'-diphenyl methane diisocyanate or 1,5-naphthylene diisocyanate.

The aforementioned diisocyanates can be used together with up to 15% polyisocyanate (relative to diisocyanate) but only sufficient to produce a product-which has not been cross-linked. Triphenyl methane-4,4',4"-triisocyanate and polyphenyl polymethylene polyisocyanates are examples.

The chain-lengthening agents with a molecular weight of 62 to 500 are preferably aliphatic diols containing 2 to 14 carbon atoms, e.g. ethanediol, hexanediol-1,6, diethylene glycol, dipropylene glycol or particularly butanediol-1,4. However, use can also be made of diesters of terephthalic acid with glycols containing 2 to 4 carbon atoms, e.g. terephthalic acid bis-ethylene glycol or -butanediol-1,4, hydroxylalkylene ethers of hydroquinone such as 1,4-di(β-hydroxyethyl)-hydroquinone, (cyclo) aliphatic diamines such as isophorone diamine, ethylene diamine, 1,2-, 1,3-propylene diamine, N-methyl propylene diamine-1,3, N, N'-dimethyl ethylene diamine or aromatic diamines such as 2,4- and 2,6-toluylene diamine, 3,5-diethyl-2,4- and/or -2,6-toluylene diamine and primary ortho-di-, tri- and/or tetraalkyl substituted 4,4'-diaminodiphenyl methanes. Mixtures of the aforementioned chain-lengthening agents can also be used.

In order to produce the TPUs, the starting substances, optionally in the presence of catalysts, auxiliary substances and/or additives, can be reacted in proportions such that the equivalence ratio of NCO groups to the sum of the NCO-reactive groups, particularly the OH groups of low-molecular diols/triols and polyols, is 0.9:1.0 to 1.2:1.0, preferably 0.95:1.0 to 1.10:1.0.

The suitable catalysts are conventional tertiary amines known for this purpose, such as triethylamine, dimethyl cyclohexyl amine, N-methyl morpholine, N,N'-dimethyl piperazine, 2-(dimethyl aminoethoxy)-ethanol, diazobicyclo-)2,2,2)-octane or the like, particularly organic metal compounds such as titanium acid esters, iron compounds, tin compounds, e.g. tin diacetate, tin dioctoate, tin dilaurate or tin dialkyl salts of aliphatic carboxylic acids such as dibutyl tin diacetate, dibutyl tin dilaurate or the like. The catalysts are preferably organic metal compounds, particularly titanium acid esters, iron and/or tin compounds.

In addition to the catalysts, the starting substances can also contain auxiliary substances and/or additives, e.g. lubricants, anti-blocking agents, inhibitors, stabilisers against hydrolysis, light, heat and discoloration, flame-retarding agents, dyes, pigments, inorganic and/or organic fillers and reinforcing agents.

The reinforcing agents may more particularly be fibrous reinforcing substances such as inorganic fibers produced by prior-art methods and also suitable for coating with size.

Details about the aforementioned auxiliary substances and additives are obtainable from the technical literature, e.g. the monograph by J. H. Saunders and K. C. Frisch "High Polymers", Volume XVI, Polyurethane, Parts 1 and 2, Interscience Publishers 1962 or 1964 or DE-A 2 901 774.

Thermoplastics, e.g. polycarbonates and acrylonitrile/butadiene/styrene terpolymers, particularly ABS, are other additives which can be incorporated in the TPU. Other elastomers such as rubber, ethylene/vinyl acetate copolymers, styrene/butadiene copolymers and other TPUs can also be used. Conventional plasticisers such as phosphates, phthalates, adipates and sebacates can also be incorporated.

According to the invention, TPUs are produced continuously by an extrusion method, optionally in conjunction with a prepolymer reactor.

First, a TPU is prepared from the set formulation using the aforementioned constituents, i.e. polyol, isocyanate and chain-lengthening agents but without a catalyst, and its recrystallisation temperature is measured (in ° C., cooling the melt by 40° C. per minute in a differential scanning calorimeter).

The reaction is repeated with progressively increasing proportions of catalyst, preferably between 1 and 1000 ppm relative to the polyol.

The resulting TPU samples are used for differential scanning calorimeter (DSC) measurements. The recrystallisation temperature $T_c$ is a measure of the crystallinity and consequently of the crystallite size of the TPU (C. S. Schollenberger, Abstr. Pap. Am. Chem. Soc. 1979, 83; J. Foks et al., Eur. pol. J. 25, 31).

The DSC measurement is made as follows: the substance is heated from −70° C. to 260° C. at 20° C./min in a nitrogen atmosphere, then cooled at 40° C./min to −70° C. During the heating-up phase, the wide endothermic peaks above 100° C. indicate the melting range of the crystalline TPU components, whereas during the cooling phase the sharp exothermic peak indicates crystallisation.

When the proportion of catalyst increases, the recrystallisation temperature and consequently the crystallinity of the TPU decrease. The substance with reduced crystallinity is easier to melt during the moulding process.

If the recrystallisation temperature is at least 2° lower than when operating without a catalyst, there will be a marked decrease or complete disappearance of inhomogeneities, e..g. in blown-film manufacture, due to non-melted crystallites.

If however the amount of catalyst is increased further, the stability and homogeneity of the film produced from the TPU will again be adversely affected. These preliminary tests are used to fix the set value for the recrystallisation temperature at which the films are processed in optimum manner.

The set recrystallisation temperature depends on the TPU formulation and must be determined individually for each product. However, it is at least 2° C. below the value for the corresponding TPU when manufactured without a catalyst.

In the method of manufacture according to the invention, therefore, the proportions are progressively altered so as to lower the recrystallisation temperature to the set value at which optimum extrusion processing is guaranteed. The temperature is monitored by taking samples. It should not deviate from the set value by more than 2° C.

If the limit is exceeded upwards, e.g. due to fluctuating polyester activity, the proportion of catalyst is increased to the extent determined during the preliminary tests, or is decreased if the temperature falls below the recrystallisation value.

The catalyst can be proportioned separately or added directly to the raw materials, polyol and/or chain-lengthening agent. TPUs manufactured according to the invention have a hardness range of 75 Shore A to 70 Shore D. The preferred TPUs have a hardness of 75 to 95 Shore A, where the influence of the catalyst on the morphology is particularly marked.

The resulting substances have very good mechanical properties and are particularly suitable for producing polyurethane films and calendered and powder-slush articles.

EXAMPLES

Example 1

100 parts by weight of a polybutanediol-1,4-adipate with a molecular weight of about 2250, 2.4 parts by weight of hexanediol and 0.7 parts by weight of a 2,2'- 6,6'-tetraiso-propyl diphenyl carbodiimide were heated to 200° C. in a heat exchanger and continuously supplied by a gear pump to a tubular reactor. 48 parts by weight of diphenyl methane diisocyanate (liquid MDI) heated to 60° C. were simultaneously applied through a nozzle. At the end of the reaction, the mixture was continuously supplied to the first casing of a two-shaft kneader (ZSK 83, manufactured by Messrs. werner/Pfleiderer). 0.2 parts by weight of bisethylene stearyl amide powder and 11.0 parts by weight of liquid butanediol heated to 60° C. were introduced into the same casing. The total amount introduced was about 660 kg/h.

The casing temperature was about 75° C. to 260° C. The speed of the ZSK was set at 300 rpm. The TPU was extruded in the form of a molten strand, cooled in water and granulated.

Examples 2 to 4

The examples were worked in similar manner to Example 1. In addition, 10, 15 or 20 ppm respectively of titanyl acetyl acetonate per 100 part by weight of polybutanediol-1,4-adipate were added to the polyester mixture.

Examples 5 to 9

100 parts by weight of a polybutanediol-1,4-adipate with a molecular weight of about 2250 and 0.7 parts by weight of a 2,2'-6,6'-tetra-iso propyl diphenyl carbodiimide were heated to 140° C. in a heat exchanger and continuously supplied by a gear pump to a tubular reactor. At the same time, 40 parts by weight of diphenyl methane diisocyanate (liquid MDI) heated to 60° C. were supplied through a nozzle. The tubular reactor was agitated at about 1500 rpm using a spiked agitator.

At the end of the reaction, the mixture was continuously supplied to the first casing of a two-shaft kneader (ZSK 53, manufactured by Messrs. Werner/Pfleiderer). 10.5 parts by weight of liquid butanediol heated to 60° C. were introduced into the same casing. 0.6 parts by weight of bis-ethylene stearyl amide powder were introduced into the casing 8. The total amount was about 90 kg/h. The casing temperature was about 170° C. to 200° C. The speed of the ZSK was set at 300 rpm. The TPU was extruded in the form of a molten strand, cooled in water and granulated. In Examples 6 to 9, 1.5, 5, 10 and 15 ppm respectively of titanyl acetyl acetonate per 100 parts by weight of polybutanediol-1,4-adipate was added to the polyester mixture.

Examples 10 to 12

100 parts by weight of a polybutanediol-1,4-adipate with a molecular weight of about 1000 was heated to 140° C. and reacted with 14 parts by weight of butanediol and 65 parts by weight of diphenyl methane diisocyanate with agitation in a pot. After 30 seconds, the reaction mixture was poured on to a coated metal sheet and heat-treated at 120° C. for 30 minutes.

In Examples 11 and 12, 10 and 15 ppm respectively of titanyl acetyl-acetonate per 100 parts by weight of polybutanediol-1,4-adipate was additionally used.

The Table shows the physical test results (the DSC measurements were made with a DSC-7 manufactured by Messrs. Perkin Elmer) and the film processing.

The method according to the invention, in the case of the three different TPU formulations with 15 ppm catalyst (Example 3), 10 ppm (Example 8) and 15 ppm (Example 11) gives a TPU which melts as required and, during film processing, can be converted into a stable film with high homogeneity. Upward or downward deviations in the proportion of catalyst immediately have an adverse effect on the film quality.

The deviations of the recrystallisation temperature from the set value occurring during continuous manufacture were corrected by altering the proportion of catalyst.

Example 13

A TPU manufactured as per Example 3, after continuous manufacture for 4 hours, had a recrystallisation temperature of 30° C. (= 3° C. deviation from the set value). The amount of catalyst was reduced from 15 to 12 ppm, resulting in a recrystallisation temperature of 34° C. (=set value).

The blown-film test on this batch, which was completed after 8 hours, showed the following processing properties:

Stability: Good
Homogeneity: Very Good
MVR - 200° C.: 37

| Example | Amount of catalyst (ppm) | DSC $T_c$ (°C.) | MVR-200° C. cm³/10 min | Blow film test Stability | Homogeneity |
|---|---|---|---|---|---|
| 1 | 0 | 56 | 20 | Good | Medium |
| 2 | 10 | 43 | 30 | Good | Medium |
| 3 | 15 | 33 | 36 | Good | Very good |
| 4 | 20 | 25 | 52 | Medium | Medium |
| 5 | 0 | 70 | 39 | Medium | Poor |
| 6 | 1.5 | 68 | 27 | Medium | Medium |
| 7 | 5 | 61 | 21 | Medium | Medium |
| 8 | 10 | 55 | 22 | Good | Good |
| 9 | 15 | 50 | 28 | Medium | Medium |
| 10 | 0 | 80 | 19 | Good | Medium |
| 11 | 10 | 67 | 28 | Good | Good |
| 12 | 15 | 63 | 35 | Medium | Medium |

$T_c$ = crystallisation temperature

We claim:

1. A method for continuous production of thermoplastic polyurethane elastomers (TPU) from straight-chain hydroxyl-terminated polyols with organic diisocyanates and diol and optionally triol chain-lengthening agents by continuous extrusion, which comprises: determining the recrystallization temperature for the TPU formed from a given ratio of reactants in the absence of a catalyst; carrying out said continuous extrusion at said given ratio of reactants in the presence of a continuously-added catalyst; and controlling the amount of catalyst added to the continuous reaction to maintain the recrystallization temperature at a set temperature which is at least 2° C. below and not more than 40° C. below said determined recrystallization temperature, the given ratio being within a molar ratio of polyols to chain-lengthening agents of between 1:1 and 1:5 and an equivalence ratio of isocyanate groups to the sum of isocyanate-reactive groups of between 0.9:1.0 and 1.2:1.0.

2. The process of claim 1, wherein said control over the amount of catalyst comprises increasing the amount of catalyst to the continuous reaction as the recrystallization temperature exceeds the set temperature, and decreasing the amount of catalyst to the continuous reaction as the recrystallization temperature falls below the set temperature.

3. The process of claim 1 wherein the catalyst is an amine, an organometallic compound, an iron compound, a tin compound or a mixture thereof.

4. The process of claim 3 wherein the catalyst is an organometallic compound.

5. The process of claim 4, wherein the organometallic catalyst is a titanium acid ester.

6. The process of claim 3, wherein the catalyst is an iron compound.

7. The process of claim 3, wherein the catalyst is a tin compound.

8. The process of claim 1, wherein the continuous extrusion is carried out in a screw extruder.

9. The process of claim 1, wherein the straight-chain hydroxyl-terminated polyols have a molecular weight between 500–5,000 and the diol and/or triol chain-lengthening agents have a molecular weight between 62 and 500.

10. A thermoplastic polyurethane elastomer suitable for processing by extrusion produced by the process of claim 1.

11. The thermoplastic polyurethane elastomer as claimed in claim 10 having a Shore-A hardness of 75–95.

12. A blown film produced from the thermoplastic polyurethane elastomer of claim 10.

* * * * *